United States Patent [19]
Camerino

[11] 3,875,064
[45] Apr. 1, 1975

[54] CONTINUOUS DISCHARGE CENTRIFUGE

[76] Inventor: Marcello Camerino, Via Pietrasanta 12, 20141 Milan, Italy

[22] Filed: Sept. 11, 1972

[21] Appl. No.: 287,935

[30] Foreign Application Priority Data
Oct. 1, 1971  Italy .................................. 29399/71

[52] U.S. Cl. .......................... 210/370, 210/DIG. 4
[51] Int. Cl. ............................................ B04b 3/08
[58] Field of Search ....... 210/370, DIG. 4, 325, 328

[56] References Cited
UNITED STATES PATENTS

| 96,304 | 11/1869 | Brinjes | 210/370 X |
| 1,159,741 | 11/1915 | Brown | 210/370 X |
| 1,280,469 | 10/1918 | Hiller | 210/370 |
| 2,698,091 | 12/1954 | Benner | 210/370 X |
| 2,796,990 | 6/1957 | Peck | 210/370 |
| 3,661,266 | 5/1972 | Rotel | 210/370 |

FOREIGN PATENTS OR APPLICATIONS
281,483  12/1927  United Kingdom ............ 210/370

Primary Examiner—Frank A. Spear, Jr.
Attorney, Agent, or Firm—Dr. Guido Modiano; Dr. Albert Josif

[57] ABSTRACT

A continuous discharge centrifuge for material of any nature, and particularly suitable for fibrous materials comprising a rotating structure, a filtering surface associated with it and provided with its own drive, and disposed without discontinuity along essentially annular and substantially concentric paths, means for moving said filtering surface along the paths relative to the rotating structure, and systems located within the internal path for feeding the material to be centrifuged on to the filtering surface.

1 Claim, 12 Drawing Figures

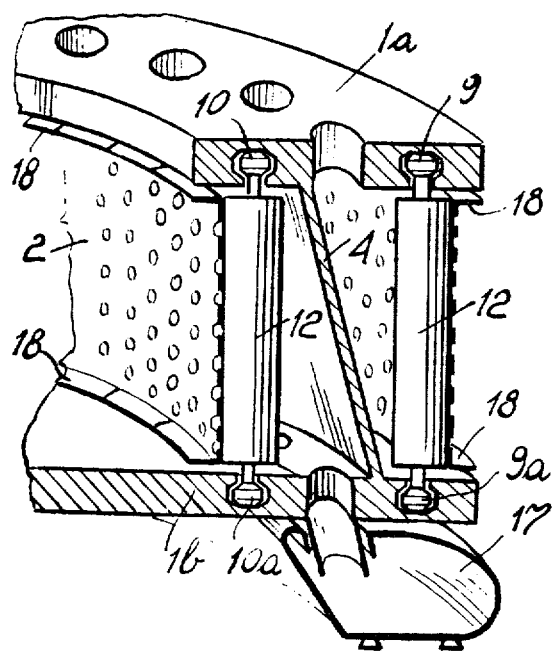
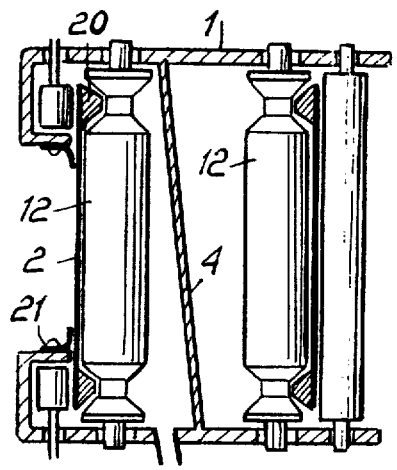
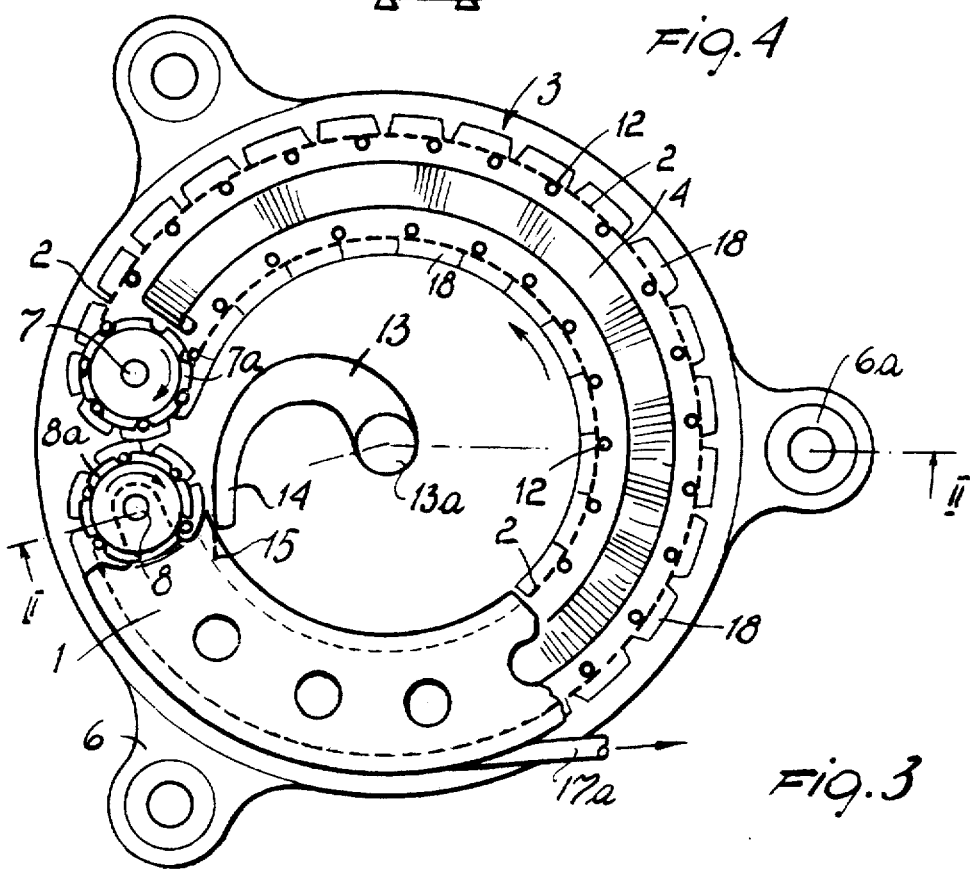
Fig. 6
Fig. 4
Fig. 3

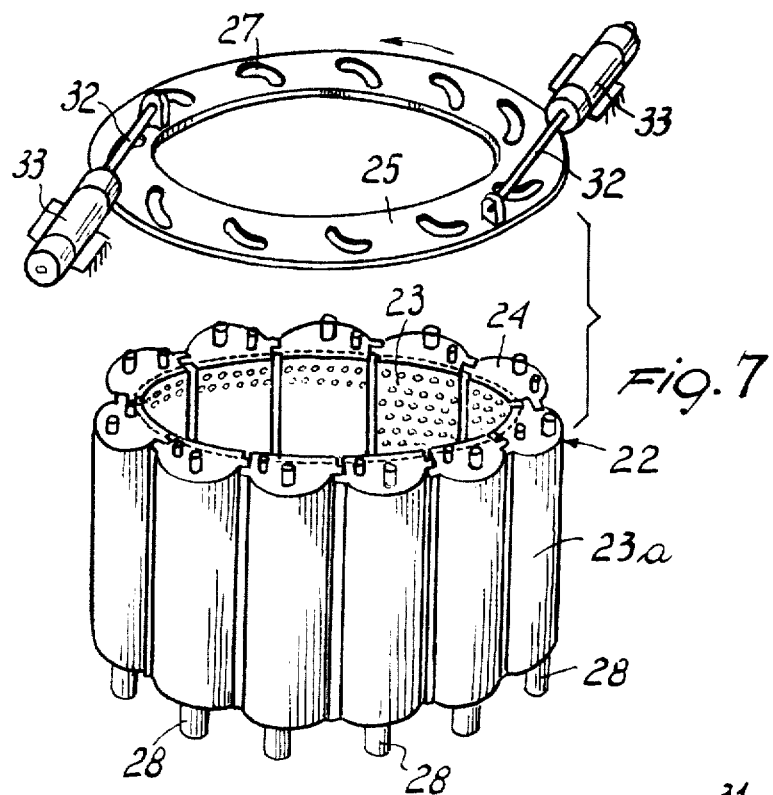
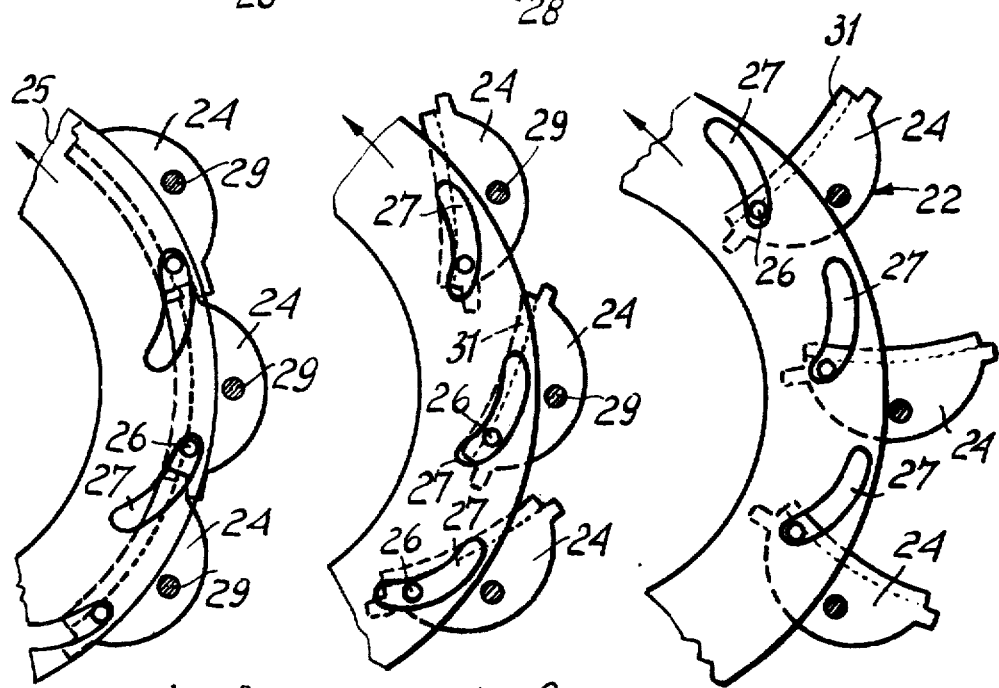

CONTINUOUS DISCHARGE CENTRIFUGE

BACKGROUND OF THE INVENTION

The present invention relates to a continuous discharge centrifuge for material of any nature, particularly but not exclusively suitable for slurry fibrous materials.

Presently available centrigures effect their continuous discharge in the majority of cases by using scraping screws, pistons or scrapers, means which can damage the materials, especially when these are fibrous materials. Often the penetration of fibres or bodies into the perforations of the filtering surface makes the use of said systems difficult because of the high resistance set up by the material.

Moreover these known devices are often of irregular operation and are difficult to use owning to the high speeds which have to be attained and the consequent considerable wear.

SUMMARY OF THE INVENTION

The main object of the present invention is to eliminate the aforementioned disadvantages by avoiding the material being subjected to damage of any kind while at the same time causing the centrifuging to take place according to the usual systems, i.e., employing large diameters, high speeds and considerable times, enabling the maximum acceleration limits to be attained and consequently separating the liquid.

Another object of the present invention is to provide for the material to be discharged in the dispersed state without the need for further disaggregation, which often results in bruising.

Another object of the invention is to provide a continuous treatment cycle for the material being processed, moreover enabling large quantities of material to be processed by making use of centrifugal forces of the same order as those provided by classical large basket centrifuges.

These and further objects are attained by the continuous discharge centrifuge for materials of any nature and in particular for fibrous materials, comprising a rotating structure, a filtering surface associated with it and provided with its own drive, and disposed without discontinuity along essentially annular and substantially concentric paths, one internal and one external, at least one substantially annular baffle placed between said paths, means adapted to move said filtering surface along said paths relative to said rotating structure, and systems located within said internal path for feeding the material to be centrifuged on to said filtering surface.

BRIEF DESCRIPTION OF THE DRAWINGS

The invention will be more evident from the description of a preferred but not exclusive embodiment of the invention, illustrated by way of non-limiting example in the accompanying drawing in which:

FIG. 2 is a vertical section on the line II-II of said centrifuge;

FIG. 3 is a plan view of the device according to the invention, without the upper part of the centrifuge housing being shown;

FIG. 4 is an enlarged detail of the sliding system employed;

FIG. 6 shows an alternative solution for guiding the filtering surfaces in their annular paths;

FIGS. 7, 8, 9, 10 and 11 are perspective and plan views of another embodiment;

DESCRIPTION OF THE PREFERRED EMBODIMENT

Figure 1:
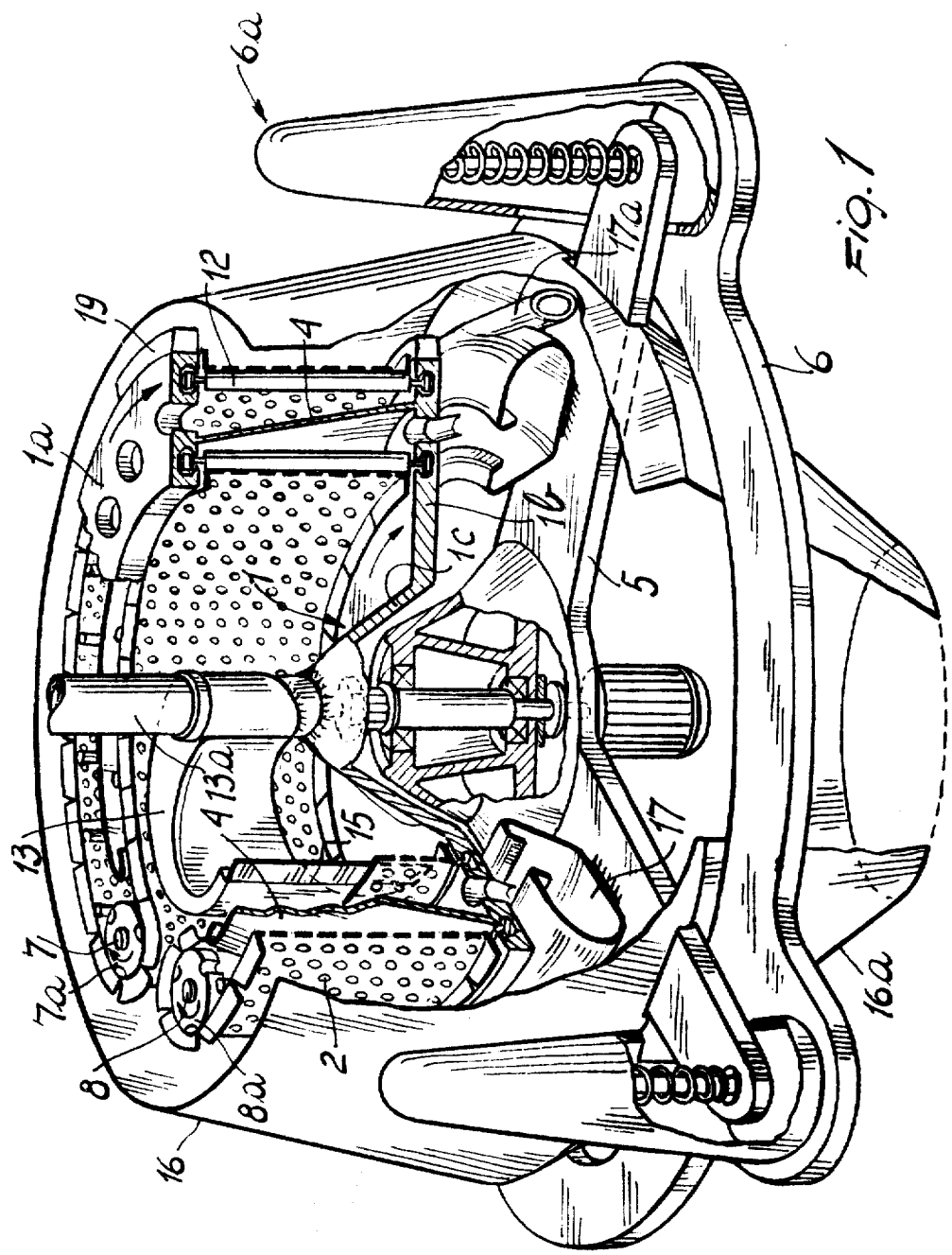
FIG. 1 is a perspective view, partly broken away, of the centrifuge according to the invention.
Figure 5:
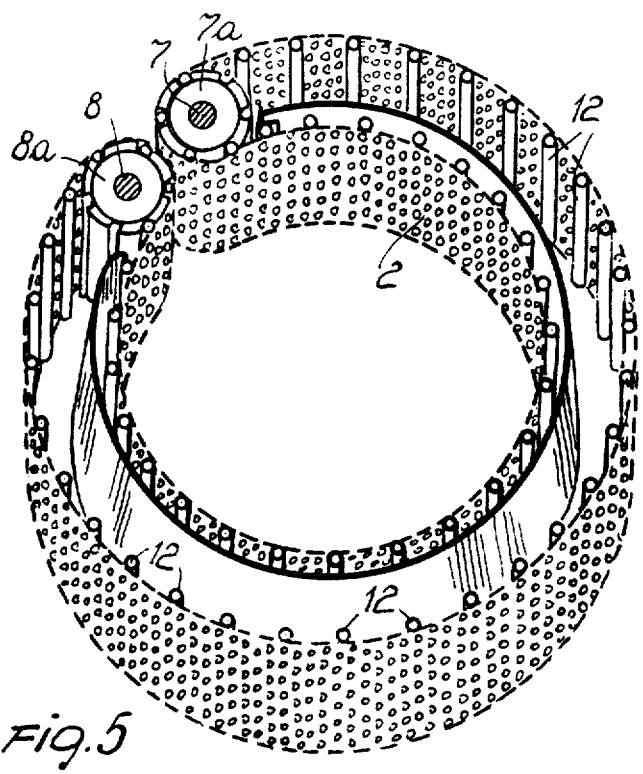
FIG. 5 is a perspective view of the rotating assembly and the filtering assembly associated with it.
Figure 11:
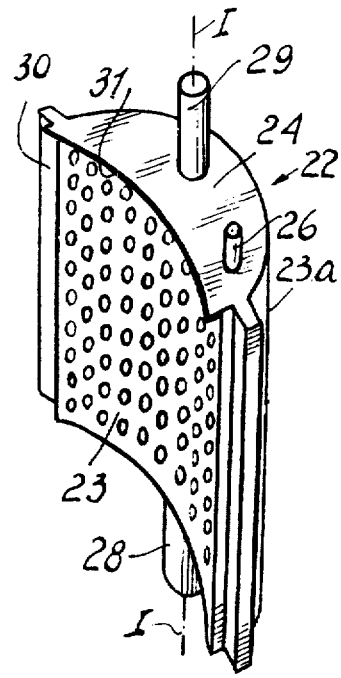

With reference to said figures and in particular to FIGS. 1, 2 and 3, the continuous discharge centrifuge according to the invention comprises a rotating structure 1, a filtering band or surface 2 associated with it, provided with its own drive and disposed without discontinuity along essentially annular and substantially concentric paths 3 (FIG. 3), a substantially annular baffle 4 slightly flared towards the bottom and located between said paths 3, and an oscillating or vibration dampening assembly 5 on the machine bed 6, which supports said rotating structure 1.

Said rotating structure 1 is composed of upper and lower crowns 1a and 1b respectively, disposed in parallel planes, the crown 1b being fixed to a radial structure 1c responsible for the alignment of the entire rotating structure 1. The crowns 1a and 1b are connected rigidly together by the baffle 4.

With reference to FIGS. 1 and 3 the rotating structure 1 also comprises two cylinders or drums 7 and 8, of which the cylinder 7 is the driving cylinder, provided at their ends with suitable gear wheels 7a, 7b, 8a and 8b (the wheel 7b is not shown in the figures) adapted to drive the filtering surface 2 which moves continuously in suitable guides 9, 9a, 10, 10a formed in said crowns 1a and 1b having a development corresponding to that of the paths 3.

The filtering surface or band 2 has a driving loop wound around the dring drum 7 and a return loop wound around the return drum 8.

The filtering surface 2 engages with said rotating structure 1 by way of a plurality of roller members 12 which slide within said guides 9, 9a, 10, 10a.

The system for feeding the material to be centrifuged terminates with a diffuser 13 rigid with the rotating assembly 1 and provided with a discharge mouth 14, terminating with a flexible edge 15 in direct contact with the surface 2, situated close to the inlet cylinder and directed tangentially towards the filtering surface 2, and involving the whole of its vertical extension.

Upstream of the diffuser 13 there is provided a tube connector 13a connected to the hopper 13b, possibly of the depression type, by a flexible joint 13c.

There are also provided rims or flanges 18, for axially retaining the liquid to be centrifuged, and rigid with the filtering surface 2.

The cylinders 7 and 8 rotate independently and at a speed less than the speed of rotation of the rotating system 1.

Rigid with the oscillating assembly 5 there is also provided an annular box 17 for collecting the separated liquid, with its outlet 17a disposed in a tangential direction.

Said oscillating structure 5 is dampened by a guided spring system 6a supported by the bed 6 of the machine.

The entire assembly is enclosed in a casing 16. In opposition to the two driving cylinders 7 and 8 there are provided variable mass systems 19 fixed to the structures 1a and 1b and adapted for statically and dynamically balancing the machine.

The operation of the machine is as follows.

The material is conveyed by the diffuser 13 on to the entire filtering surface 2, which slides at low speed driven by the driving cylinder 7, whereas the entire rotating system 1 is provided with high rotational speed.

The material to be centrifuged is forced by the flexible edge 15 on to the filtering surface 2, and is retained within this latter by the rims 18.

The liquid separated by the filtering surface 2 is retained by the baffle 4, is conveyed downwards because of the slight taper of said baffle 4 and then fed to the collecting box 17.

While the centrifugal action proceeds, the residual solids continue their journey on the surface 2 along the paths 3, until they reach the cylinder 7, which reverses the direction of rotation of the filtering surface 2. Because of centrifugal force the solid material then separates from said surface 2, and, projected on to the internal wall of the casing 16, is collected in the underlying hopper 16a.

The speed of rotation of the filtering surfacae may be suitably varied according to the type of material and degree of dehydration required.

Likewise the speed of the rotating assembly 1 may be varied, on which the centrifugal force exerted depends. Said force is employed for separating the liquid on the more internal path of travel of the surface 2, whereas on the external path it is utilised for removing the material already treated.

The invention so conceived is susceptible to numerous modifications all of which fall within the scope of the inventive idea.

Thus, as shown in FIG. 6, the roller members 12 are rotatably mounted in bores formed in the rotating structure 1. On said roller members 12 slides a filtering band 24, provided with projections 20 at its edges, for keeping the band 24 taut vertically, and in this case drive is obtained by contact with drive rollers.

The band 24 may be of flat or slightly concave form so as to prevent exit of the material to be centrifuged. In the former case lateral rims 21 are provided rigid with the rotating structure 1, for preventing exit of the material.

In a further embodiment of the invention, illustrated in FIGS. 7, 8, 9, 10 and 11 the filtering element describing the annular path is replaced by a plurality of filters 22, composed of a filtering wall 23 and a conveying wall for the liquid 23a. The walls 23 are disposed in such a manner as to define an interspace of half-moon configuration, said interspace being closed upperly and lowerly by faces 24.

The filters 22 are upperly engaged with a circular crown member 25, by way of a pawl 26 which slides in suitable guides 27 formed in the surface of the member 25. Said filters also engage with the circular crown 1a by way of a pin 29.

Lowerly said filters 22 are pivoted to the structure 1b, by way of a hollow pivot 28 provided with an axial bore communicating with the interspace defined by the walls 23. In this case the crowns 1a and 1b are evidently no longer provided with the baffle 4. The pivot 28 is coaxial with the pin 29, along a vertical axis I—I. The filters 22 are provided with lateral rims 30 for retention in the radial direction, and a rim 31 for retention in the axial direction. The member 25 is subjected to the action of piston rods 32 sliding in cylinders 33 rigid with the rotating structure 1. Under the action of said pistons, the member 25 causes the filters 22 to rotate about the axis I—I through the engagement of the pawl 26 with the guides 27, so making the filtering surfaces 23 turn over.

In this manner a discontinuous automatic discharge device is obtained, its operation being as follows.

The feed apparatus feeds the material to be centrifuged on to the surface of the filters 22 disposed in such a manner as to form a closed surface internally, as shown in FIGS. 7 and 8, then after shuting off the feed the centrifuging is carried out. The discharge water, which enters the interspace defined by the surfaces 23 and 23a, is expelled through the bore in the lowerly situated hollow pivot 28, and passes into the collecting box 17, after which the filters 22 are automatically rotated about the vertical axes I—I to enable the centrifugal force to discharge the filtered material.

Figure 12:
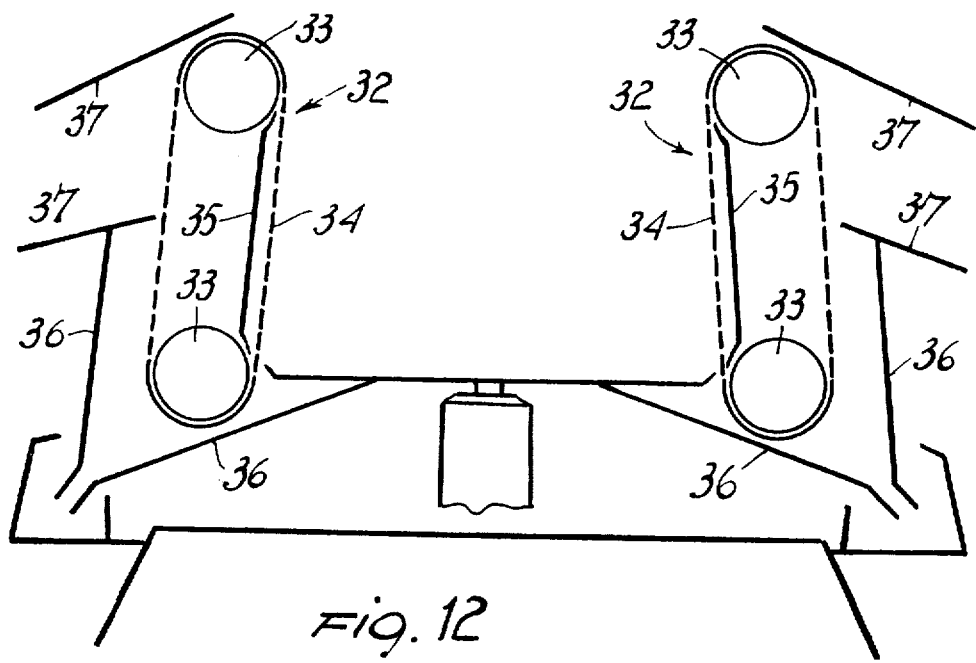
FIG. 12 is the diagrammatical representation of a further embodiment.

In a further modification of the invention, illustrated diagrammatically in FIG. 12, the filtering apparatus is composed of one or more filtering elements 32, placed about the axis of rotation of the structure 1 and rigid with it.

The filtering elements 32 each comprise two rollers 33, of which one is a driving roller, and about which is wound a filtering band 34. In the interspace between the opposing surfaces defined by the band 34 wound around the rollers 33, there is a baffle 35. Advantageously there are also provided surfaces 36 for guiding the liquid discharge, and surfaces 37 for guiding the discharge of the filtered product.

In this manner a continuous automatic discharge device is obtained, its operation being as follows.

The feed apparatus feeds the material to be centrifuged on to the filtering surfaces 34. Said material is contained within this latter by suitable rims not shown. The structure 1 is rotated and the liquid is separated by the filtering surface 34, by means of centrifugal force. Said liquid, guided firstly by the baffle 35 with conveying guides not shown, is then conveyed to discharge by the guides 36. While centrifugal action proceeds, the fibres, free of water, continue their journey on the surface 34 driven by the rollers 33, until the reversal of the path, caused by one of the rollers, enables the same centrifugal force to separate said fibres from the filtering band 34. The fibres, projected on to the guide surfaces 37, are conveyed from this latter to a suitable discharge hopper, not shown in the figure.

I claim:

1. A continuous discharge centrifuge for separating the solid portion of a slurry material from the liquid portion thereof, and more particularly fibrous matter from liquid, comprising in combination: a substantially circular revolving structure having guiding means defining substantially circular paths; a vertically arranged filtering structure supported by said revolving structure, said revolving structure having an upper annular plate member a lower plate member and therebetween a frustoconical baffle member rigidly connecting said upper with said lower plate member, an arcuate, centrally mounted material diffuser spanning the full height of said filtering structure and having a flexible outlet edge flap member; a feeding hopper centrally mounted above said diffuser and connected thereto; an annular, liquid collecting box mounted beneath said baffle member; an outer casing of substantially frustoconical configuration for conveying the separated solid portion downwards; a solid portion receiving hopper mounted underneath said outer casing; a frame structure vibration dampening means supporting said frame structure; and a centrally located motor suspended from said frame structure for the purpose of driving said revolving and filtering structures; wherein said filtering structure has a widthwise straight endless belt of foraminous material having flange formation on the longitudinal edges thereof, said belt being mounted for rotation with said revolving structure and arranged to simultaneously circulate in said substantially circular paths concentric to said revolving structure, thereby defining a substantially cylindrical enclosure comprising a filtering inner run whereon said solid portion collects the liquid portion passing therethrough, and an outer or return run, said endless belt having lower and upper roller means guided along said circular paths, by said guiding means, at least one driving drum and nearby at least one return drum for said endless belt, said endless belt having a drive loop wound around said driving drum and a return loop wound around said return drum said drive and return loops defining a gap therebetween, said endless belt forming a continuous filtering surface exepting said gap, for the solid portion to detach from said filtering surface under centrifugal acceleration, said baffle member being arranged between said belt runs.

* * * * *